United States Patent Office 2,757,838
Patented Aug. 7, 1956

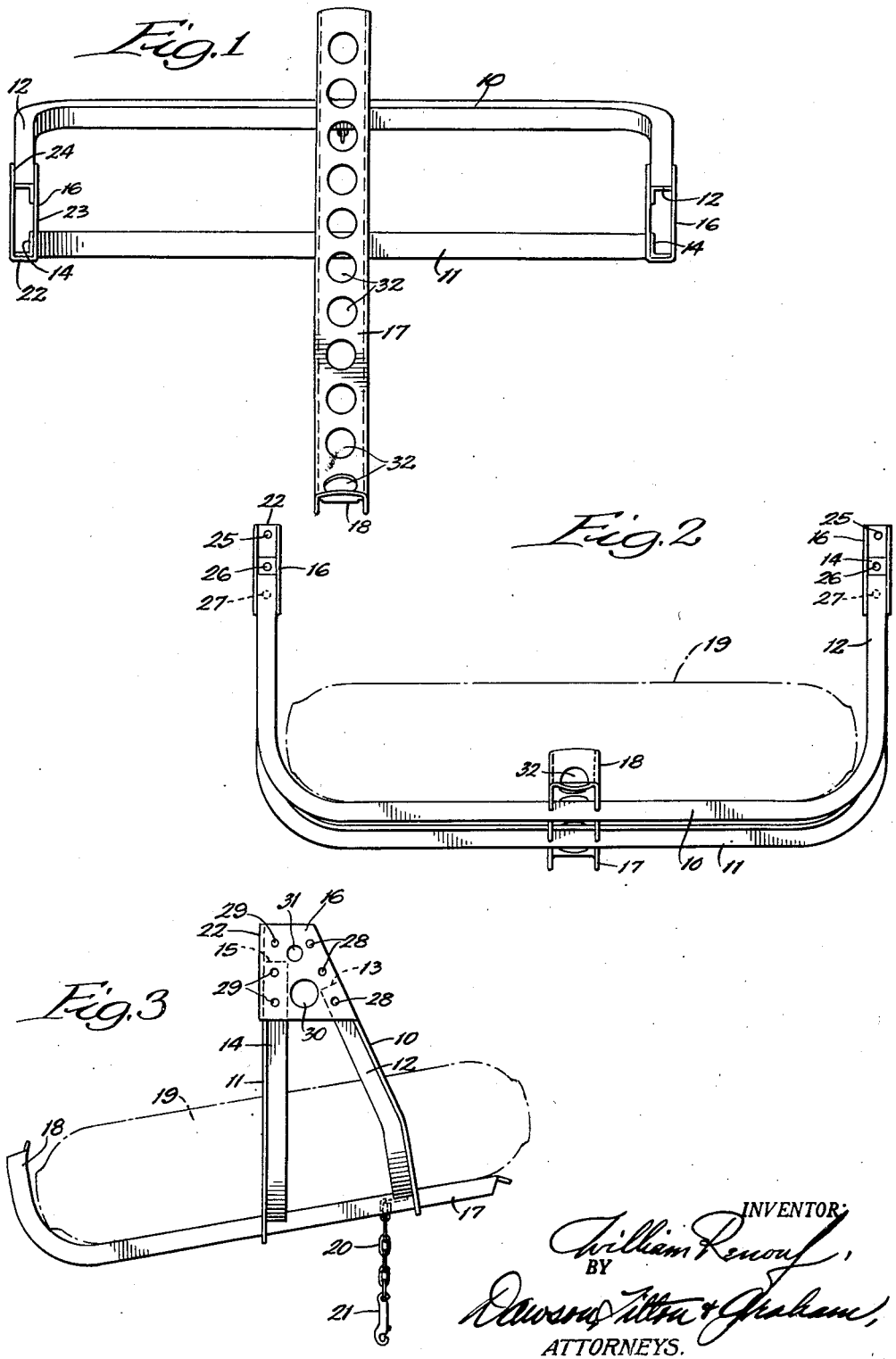

2,757,838

SLANT BASKET TIRE CARRIER

William Renouf, Wilmette, Ill., assignor to Nash Bros. Co., Evanston, Ill., a corporation of Delaware Application April 7, 1954, Serial No. 421,611

4 Claims. (Cl. 224—42.23)

This invention relates to a slant basket tire carrier, and more particularly to basket or shelf type carriers for supporting tires below trucks, trailers, etc.

An object of the invention is to provide a tire carrier of light weight and strong construction which may be secured to trucks and trailers of various types of construction without the necessity of using special attachment plates or members. A further object is to provide in a basket tire carrier of the character described, a mounting bracket means by which the carrier can be suspended to trucks having a longitudinal beam construction as well as to frameless trailers having cross sill construction, etc. Yet another object is to provide in a basket tire carrier a unique means for joining the legs of the carrier so as to provide a sturdy box structure for supporting the carrier upon the trailer truck, etc. A still further object is to provide in a basket tire carrier structure means for uniting the legs of the U-shaped supporting main members in such a manner as to integrate them in a box-like structure, while at the same time providing access to the interior of the box for the manipulation of attachment means. Other specific objects and advantages will appear as the specification proceeds.

The invention is shown, in an illustrative embodiment, by the accompanying drawing, in which—

Figure 1 is a top plan view of a basket spare tire carrier embodying my invention; Fig. 2, a front view in elevation; and Fig. 3, a side elevational view.

In the illustration given, I provide two U-shaped main members supports 10 and 11. Each of the main members is formed of angle iron construction, with flanges running at right angles to each other. The front support 10 has vertically-extending legs 12 which terminate at 13. The rear support 11 has also vertically-extending legs 14 which terminate at 15, as shown more clearly in Fig. 3. The legs 12 and 14 are inclined toward each other and the legs at each side of the carrier are encompassed by a U-shaped mounting bracket 16.

The supports 10 and are 11 are spaced apart at their bottoms so as to provide a saddle or sling for receiving the the tire. A crook bar 17 is welded to each of the bottom stretches of the supports 10 and 11 and extends rearwardly in a tilted position, the rear end portion of the bar 17 terminating in a crook or curved portion 18 adapted to receive the end of the tire 19 when the same is received within the carrier. A chain 20 and snap 21 is provided for securing the spare tire firmly within the carrier.

A problem has long existed with respect to the attachment of the main member legs 12 and 14 and with respect to securing them to a truck or trailer. Many vehicles have longitudinal frame structures to which the carriers must be secured, while there are also frameless trailers equipped with cross sills into which the carrier is to be secured. At the same time, in order to provide a sturdy carrier, it has been necessary to provide some means for connecting the upper ends of the strap legs and for securing them to the trailer or truck structure.

I have discovered that an extremely light carrier can be provided while at the same time securing the carrier in a very sturdy manner to the truck or trailer vehicles by utilizing a U-shaped mounting bracket structure 16 which cooperates effectively with the angle iron structure of the straps to produce a box-like frame adapted to support the load upon the vehicle.

The U-shaped bracket structure 16, as shown more clearly in Fig. 1, has a closed rear side 22 and forwardly-extending legs 23 and 24. Between the legs 23 and 24 there are received the legs 12 and 14 with the flanges of the legs extending between the members 23 and 24 so as to form a box therewith. When the structure is welded together in the form shown in Fig. 1, an extremely sturdy support is provided which not only intgerates the legs 12 and 14 with the U-shaped mounting brackets 16, but also in the structures shown provides access to the interior of the box for the manipulation of fastening elements which will be described.

With the box-like structure formed at the top of each of the straps through the use of the U-shaped mounting brackets 16, it is possible to provide for the mounting of the resulting structure from different sides and in different positions. For example, when the carrier is to be secured to a vehicle with longitudinal frame construction, the rear wall 22 of the U-shaped bracket 16 is provided with openings through which bolts may be extended into the longitudinal frame. As shown more clearly in Fig. 2, the rear wall 22 of the bracket is provided at its top with a bolt opening 25. Openings 26 and 27 are provided therebelow, the latter openings extending not only through the rear wall 22, but also through the aligned flanges of the rear leg 11. With this structure, the bolts may be passed through any two of the aligned openings in the longitudinal frame construction for the supporting of the carrier upon such frame.

When the brackets are to be supported upon a frameless trailer with cross sill construction, bolts may be passed through the openings 28 and 29 of the brackets. In the illustration given in Fig. 3, there is a vertical series of openings 29 on one side of the bracket and a similar series of openings 28 on the opposite side of the bracket. On frameless trailers with the cross sill construction, the six holes described on either side of the brackets may be used, the bolting being done through a right-hand and a left-hand cheek, respectively, depending upon which way flanges of cross sills to which the basket is bolted happen to point.

Instead of employing the particular hold construction shown, it will be understood that the box formed by the new U-shaped bracket structure in combination with the anchor ends of the legs 12 and 14, may be utilized through the use of holes placed at different points for the universal mounting of the bracket upon truck and trailer structures.

Between the openings 28 and 29, I provide holes 30 and 31 which reduce the weight of the structure while at the same time provide another means of access into the interior of the box.

The cross bar 17 for supporting the tire is also provided with a series of openings 32 which lighten the structure while also providing a strong support for the tire.

The new carrier, by reason of the structure described above, weighs approximately one-half of what prior carriers have weighed, while at the same time providing a wider and longer-legged structure. By utilizing the box-like mounting bracket described herein, with means for integrating the legs of the supporting members, it is possible to provide a structure of extremely light weight while at the same time producing a universal type mount- While, in the foregoing specification, I have set forth a specific structure in considerable detail for the purpose of illustrating phases of the invention, it will be understood that such details of structure may be varied widely by those skilled in the art without departing from the spirit of my invention.

I claim:

1. A tire carrier adapted to be secured upon a vehicle frame, comprising a pair of U-shaped metal straps spaced apart at their bottoms and having their upper ends adjacent each other, a box bracket enclosing the upper ends of said straps and united thereto, one of said straps having its central portion lower than the central portion of the other, and a crook bar carried by said straps in a tilted position with the crook end of the bar lowermost.

2. The structure of claim 1, in which the box bracket has a side wall and an end wall provided with attachment openings.

3. A tire carrier, comprising a sling support composed of two U-shaped straps, a box bracket enclosing the top portions of said straps and adapted to be secured to the frame of a truck, said straps diverging as they extend downwardly and the bottom of one strap being lower than the bottom of the other, and a crook bar resting upon and secured to said straps in a tilted position, with the crook portion of the bar extending downwardly.

4. The structure of claim 3, in which one of said U-shaped straps extends substantially in a vertical plane while the other of said U-shaped straps is inclined rearwardly thereof and has its bottom at an elevation above the bottom of said first-mentioned U-shaped strap.

References Cited in the file of this patent

UNITED STATES PATENTS

| | | |
|---|---|---|
| 1,664,856 | Green | Apr. 3, 1928 |
| 2,417,952 | Selzer et al. | Mar. 25, 1947 |
| 2,449,544 | Ballard | Sept. 21, 1948 |